United States Patent [19]

Theodorou

[11] Patent Number: 5,758,988
[45] Date of Patent: Jun. 2, 1998

[54] LOCKING DEVICE AND SYSTEM FOR STRUCTURAL CONNECTION

[76] Inventor: Antonis Theodorou, 737 Danielle Ct., Sleepy Hollow, Ill. 60118

[21] Appl. No.: 662,376

[22] Filed: Jun. 12, 1996

[51] Int. Cl.⁶ .................................................. F16D 1/00
[52] U.S. Cl. ..................... 403/331; 160/135; 211/103; 211/182; 211/192; 403/3; 403/321; 403/353
[58] Field of Search ..................... 160/135; 211/103, 211/182, 192; 403/3, 13, 321, 322, 324, 331, 353, 393

[56] References Cited

U.S. PATENT DOCUMENTS

| | | |
|---|---|---|
| 3,332,182 | 7/1967 | Mark ........................... 403/353 X |
| 3,352,584 | 11/1967 | Engel . |
| 3,545,626 | 12/1970 | Setz . |
| 3,741,405 | 6/1973 | McConnell et al. . |
| 3,986,318 | 10/1976 | McConnell ................... 403/353 X |
| 4,134,564 | 1/1979 | Hanna ........................... 403/353 X |
| 4,148,106 | 4/1979 | Gallien . |
| 4,157,228 | 6/1979 | Hammerschlag . |
| 4,189,250 | 2/1980 | Abbott et al. . |
| 4,413,366 | 11/1983 | Whitehead . |
| 4,425,049 | 1/1984 | Travis . |
| 4,536,904 | 8/1985 | Whitehead . |
| 4,618,064 | 10/1986 | Viklund . |
| 4,723,666 | 2/1988 | Nichols . |
| 5,025,937 | 6/1991 | King . |
| 5,058,347 | 10/1991 | Schuelke et al. ............... 160/135 X |
| 5,351,740 | 10/1994 | Hanna . |
| 5,377,466 | 1/1995 | Insalaco et al. ............... 160/135 X |
| 5,624,045 | 4/1997 | Highsmith et al. ........... 403/353 X |

Primary Examiner—Brian K. Green
Assistant Examiner—Andrea Chop
Attorney, Agent, or Firm—Meroni & Meroni

[57] ABSTRACT

A locking device for releasable connection of frame members and knock-down structures. The device includes a first rail having a front wall provided with a slot. A second rail has a front wall provided with a slot. The front walls of the first and second rails are positionable in confronting relationship with one another. An elongated member has at least one hook extending therefrom. The elongated member is disposed on a back side of the front wall of the first rail with the hook extending through the slots of the first and second rails. The elongated member is movable along a longitudinal axis of the first rail from an unlocked position to a locked position with the hook engageable with the second rail. A pin structure engages transversely between the first and second rail for holding the first and second rail in fixed alignment with one another to prevent relative movement between the first and second rails in a plane generally coplanar with the front walls of the first and second rails.

26 Claims, 11 Drawing Sheets

LOCKING DEVICE AND SYSTEM FOR STRUCTURAL CONNECTION

BACKGROUND OF THE INVENTION

1. Field of the Invention

The present invention relates generally to connectors and locking devices for the connection of frames and structures. More particularly, the invention pertains to a releasable locking device for rigid connection of frame members and knock-down structures.

2. Description of the Prior Art

Various prior art connectors and hook assemblies are known in the art to provide a releasable connection between various components. Such connectors and hook assemblies provide structures that can be easily assembled and disassembled without the use of special tools.

A commonly used hook assembly used in the construction bed frames and shelving structures, for example, provides one or more downwardly projecting hook members that are secured to a first member. A second member has one or more slots for receiving the hook members whereby sliding movement of the first member in a downward fashion engages the hook members within the respective slots.

A significant disadvantage of this type of hook assembly resides in the fact that when connected, the assembly is not lockable to hold the first and second members in locked position with one another. An upward force applied to the first member will serve to disengage the hook members from the slots.

Various devices have been provided in the prior art to provide a lockable connector assembly. For example, U.S. Pat. No. 5,351,740 issued to Hanna discloses an attachment plate having a protecting hook which mates with a slot in a mounting post. The plate has a locking tab which also enters the slot and restrains reversed relative movement between the plate and slot, so as to limit any undesired disassembly. While this device provides a satisfactory manner of attachment, it suffers from a problem common with other prior art connectors in that connection and disconnection requires sliding movement of the connecting members relative to one another.

As will be described in greater detail hereinafter, the device and structure of the present invention differs from those previously proposed and employs a number of novel features that render it highly advantageous over the prior art.

SUMMARY OF THE INVENTION

Accordingly, it is an object of this invention to provide a locking device for the connection of two members that does not require gravity to function and does not disengage unless specifically released.

Another object of this invention is to provide a locking device that provides a strong and rigid connection.

Another object of this invention is to provide a locking device that does not require sliding movement against mating members to engage or disengage.

Another object of this invention is to provide a locking device that is easy to mount and use, does not require the use of special tools to operate, and can be inexpensively manufactured.

Still another object of this invention is to provide a locking device which can be easily and selectably modified to operate in a traditional manner requiring sliding movement between mating members to engage and disengage.

Yet another object of this invention is to provide a locking device which can be applied in the connection of materials of varied composition in the connection of support frames, knock-down structures, and the like.

To achieve the foregoing and other objectives, and in accordance with the purposes of the present invention a locking device is provided. The device includes a first rail having a front wall provided with a slot. A second rail has a front wall provided with a slot. The front walls of the first and second rails are positionable in confronting relationship with one another. An elongated member has at least one hook extending therefrom. The elongated member is disposed on a back side of the front wall of the first rail with the hook extending through the slots of the first and second rails. The elongated member is movable along a longitudinal axis of the first rail from an unlocked position to a locked position with the hook engageable with the second rail. A pin structure engages transversely between the first and second rail for holding the first and second rail in fixed alignment with one another to prevent relative movement between the first and second rails in a plane generally coplanar with the front walls of the first and second rails.

In accordance with an aspect of the invention, the pin structure is selectably positionable in a second position for engaging the first rail and elongated member to hold the first rail and elongated member in fixed position relative to one another. The first rail being movable along the longitudinal axis relative to the second rail for movement between the unlocked position and the locked position.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
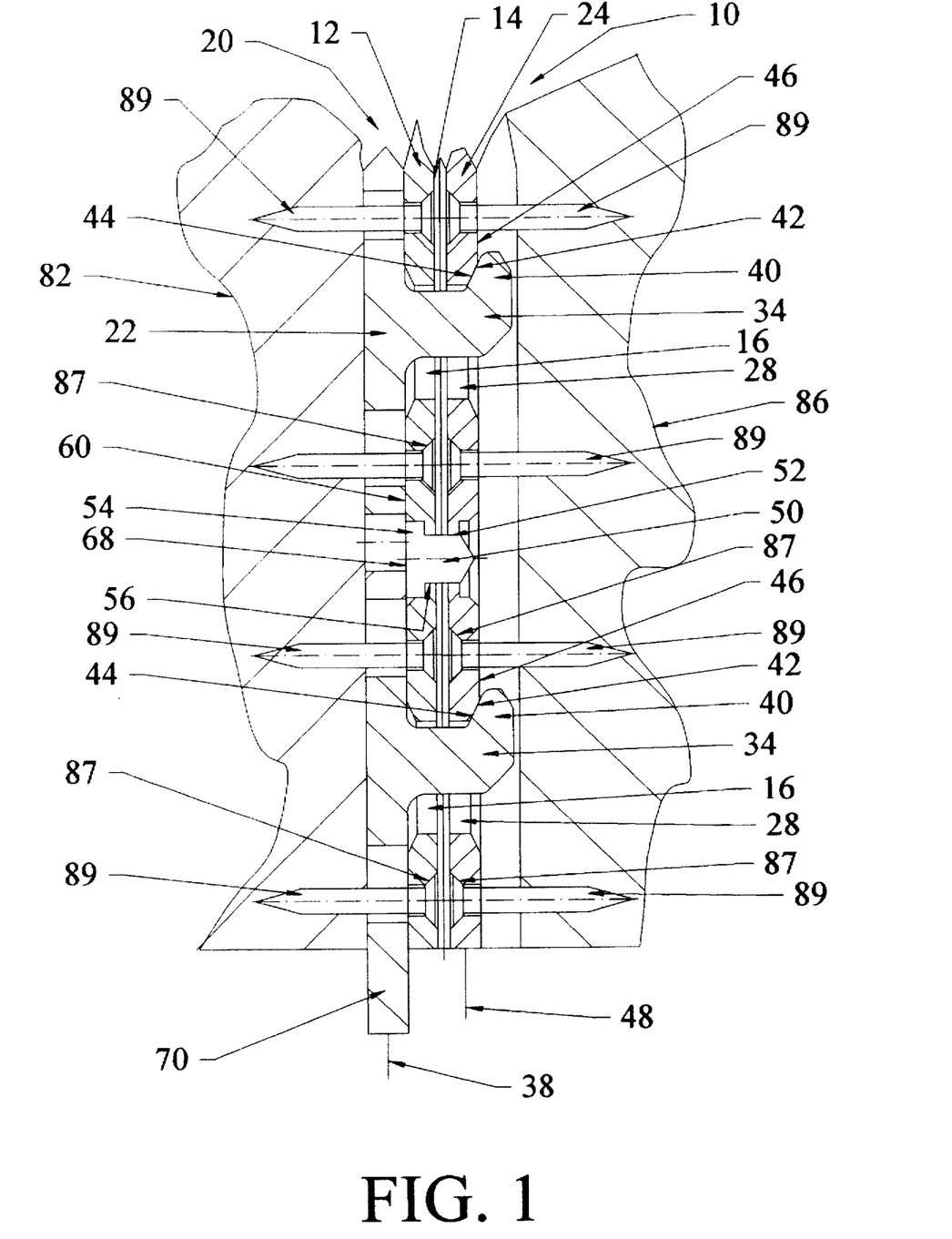
FIG. 1 is a sectional view of the present invention in a locked position.

Referring now to the drawings, a locking device or assembly 10 is illustrated in FIG. 1 used in the construction of frames, furniture, knock-down structures, as well as other structures. The device 10 can be operated without the need for special tools and provides a rigid connection that is selectably disengageable by a user, but is resistant to disengagement by multi-directional forces that may be applied thereto.

Referring to FIGS. 4–7, a first rail 12 is provided having a front wall 14 provided with at least one slot 16. The first rail 12 has a pair of spaced apart side walls 18, 19 connected perpendicular to the front wall 14 along opposite edges 17. The side walls 18, 19 and front wall 14 form a channel 20 sized for receiving an elongated member 22 therewithin.

A second rail 24 has a front wall 26 provided with at least one slot 28. The second rail 24 has a pair of spaced apart side walls 30, 31 connected perpendicular to the front wall 26 along opposite edges 25. The side walls 30, 31 and front wall 26 of the second rail 24 form a channel 32. The front walls 14, 26 of the first and second rails 12, 24 are positioned in confronting relationship with one another when the device is in locked position, illustrated in FIG. 1. In a preferred embodiment, the first rail 12 and second rail 24 are formed identical in construction which provides both interchangeability in use and reduced costs of manufacturing.

Figure 8:
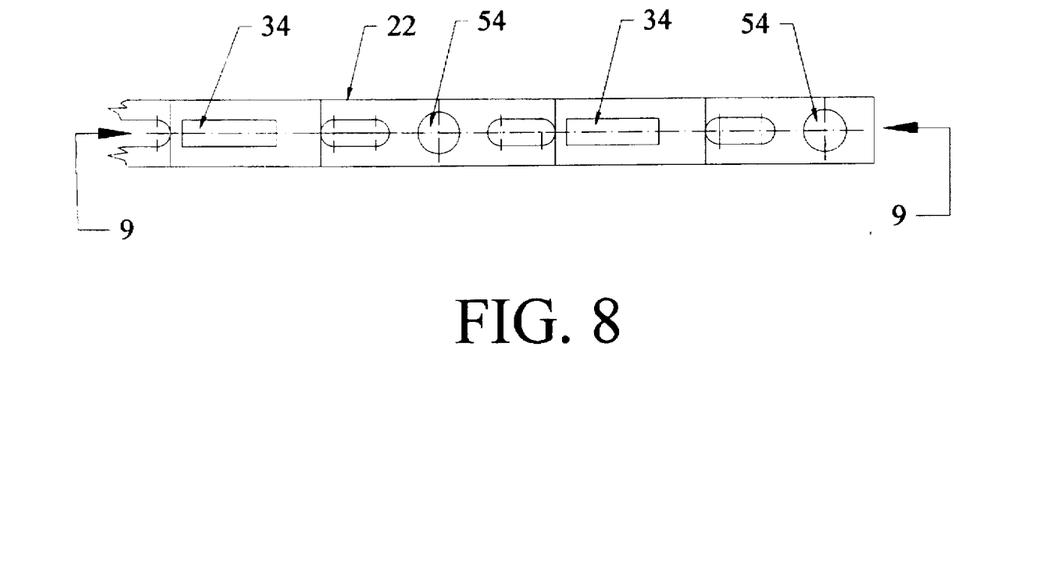
FIG. 8 is a top view of an elongated member of the present invention.
Figure 9:
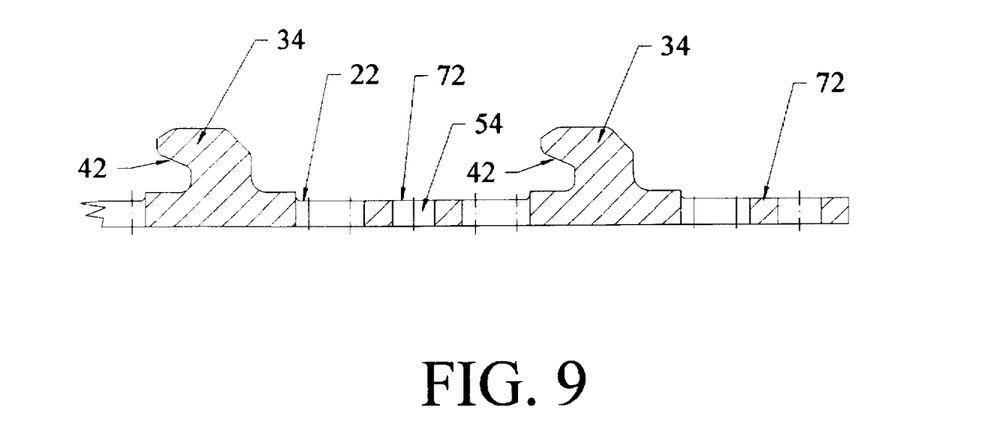
FIG. 9 is a sectional view of the elongated member taken along line 9—9 of FIG. 8.

Referring to FIGS. 8 and 9, the elongated member 22 has at least one hook 34 extending therefrom. The elongated member 22 is disposed on a back side 3,6 of the front wall 14 of the first rail 12 for movement within the channel 20. The hook 34 extends through the slot 16 of the first rail 12. The elongated member 22 is movable along a longitudinal axis 38 of the first rail 12 from an unlocked position (FIG. 2) to a locked position (FIG. 1) with the hook extending through the slot 28 and engaging the second rail 24.

Figure 2:
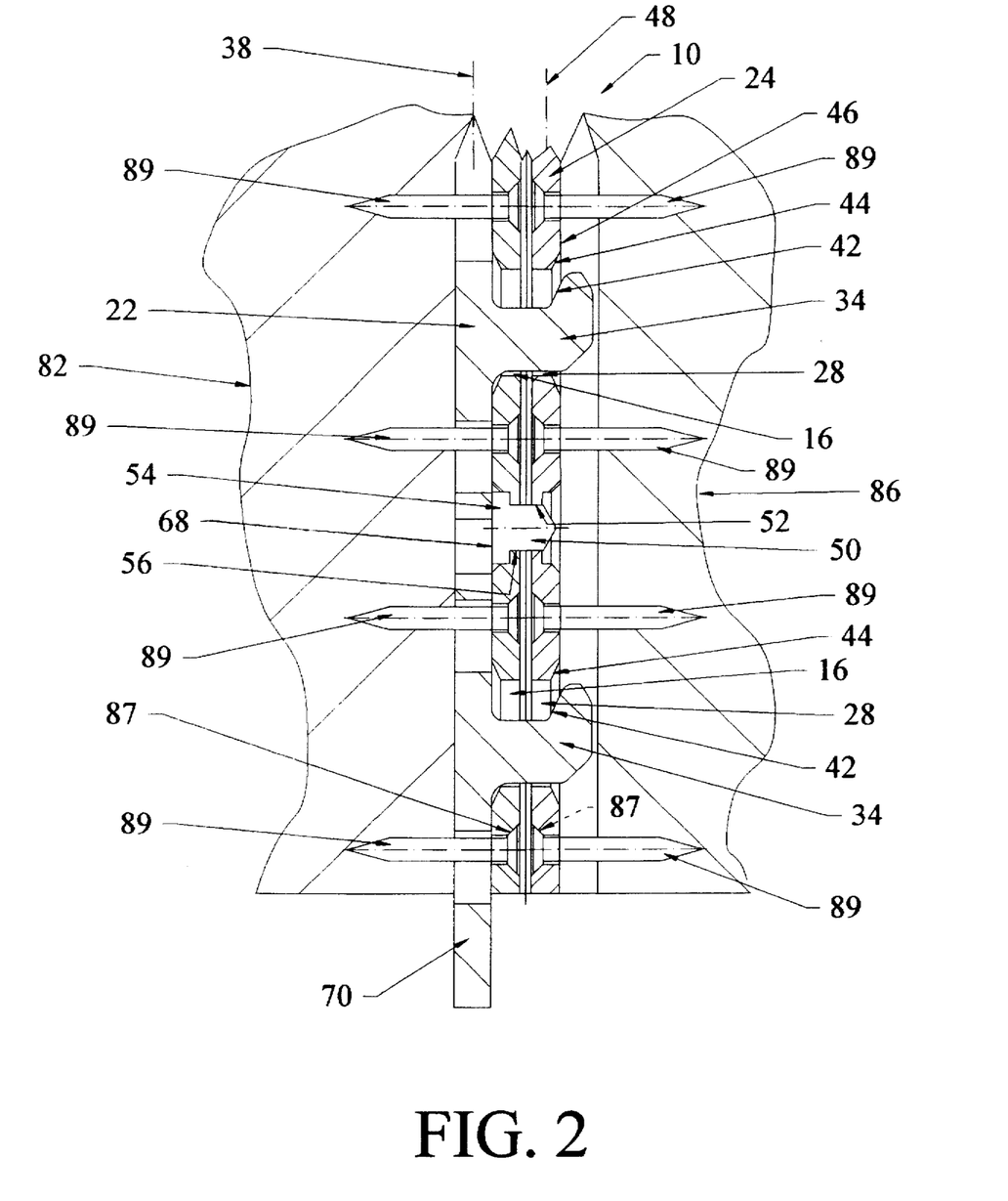
FIG. 2 is a sectional view of the present invention in an unlocked position.

Referring to FIGS. 1 and 2, the hook 34 has an angularly projecting portion 40 having an inwardly sloped edge 42. Since the device 10 can be positioned with the hook 34 extending in any direction, whether the angularly projecting portion 40 extends downwardly or upwardly, for example, will not hinder the operation of the device 10. The inwardly sloped edge 42 is frictionally engagable with a tapered surface 44 of the second rail 24 extending between a back side 46 of the front wall 26 of the second rail 24 and the slot 28. In a preferred embodiment, the inwardly sloped edge 42 and tapered surface 44 are in angled relationship approximately 10 to 15 degrees from a longitudinal axis 48 of the second rail 24. This angle is at the approximate limits of the self-locking range.

At least one pin member or structure 50 is provided for engaging the first rail 12 and outwardly extending from the front wall 14 of the first rail 12 in a first position, as illustrated in FIG. 1. The second rail 24 has an aperture 52 sized for receiving the pin member 50 in engagement therewith to hold the first and second rails 12, 24 in fixed alignment with one another to prevent relative movement between them in a plane generally coplanar with the front walls 14, 26 when the first and second rails 12, 24 are brought in assembly together.

Figure 3:
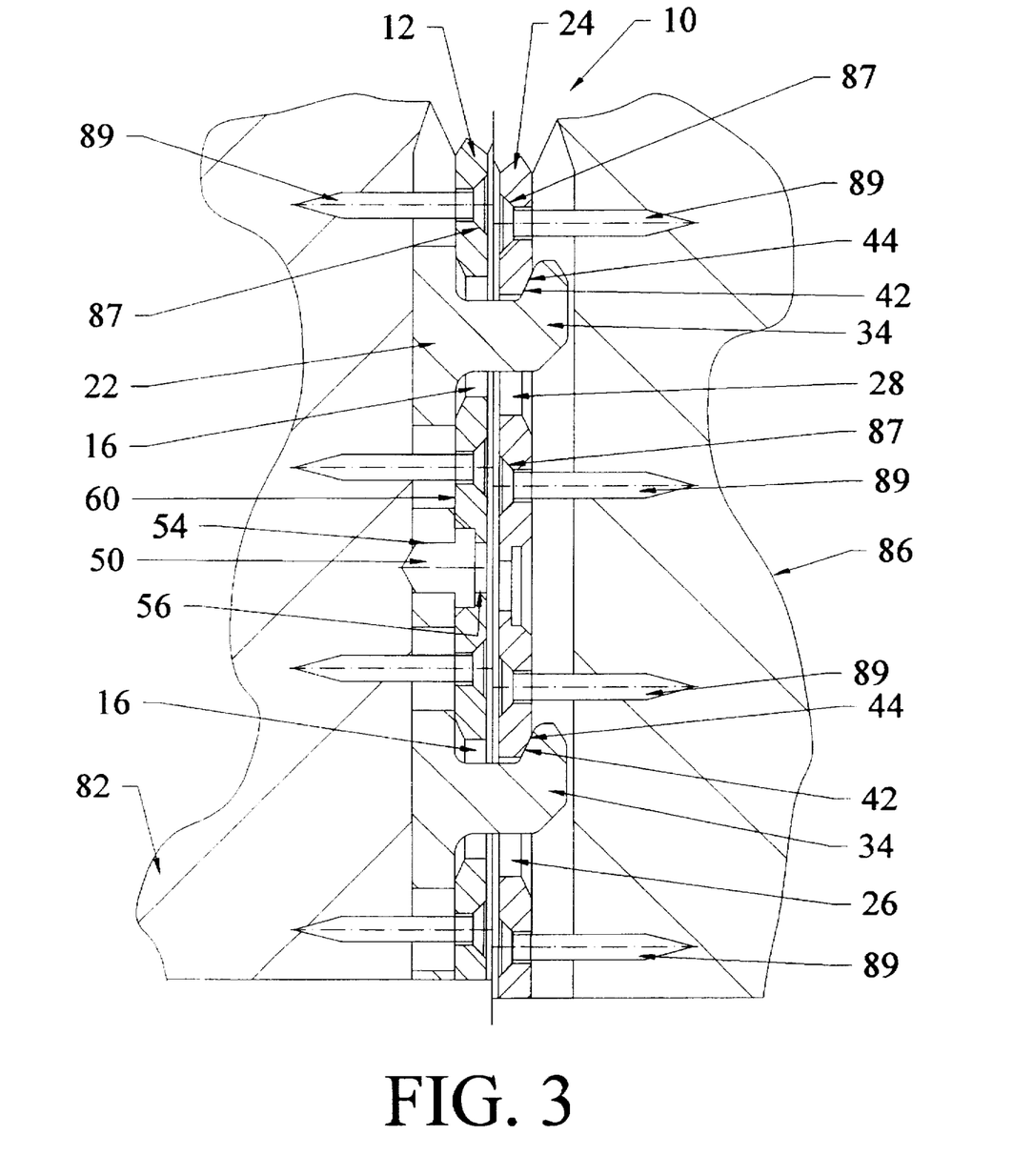
FIG. 3 is a sectional view of the present invention with the pin member in a reversed or second position.
Figure 4:
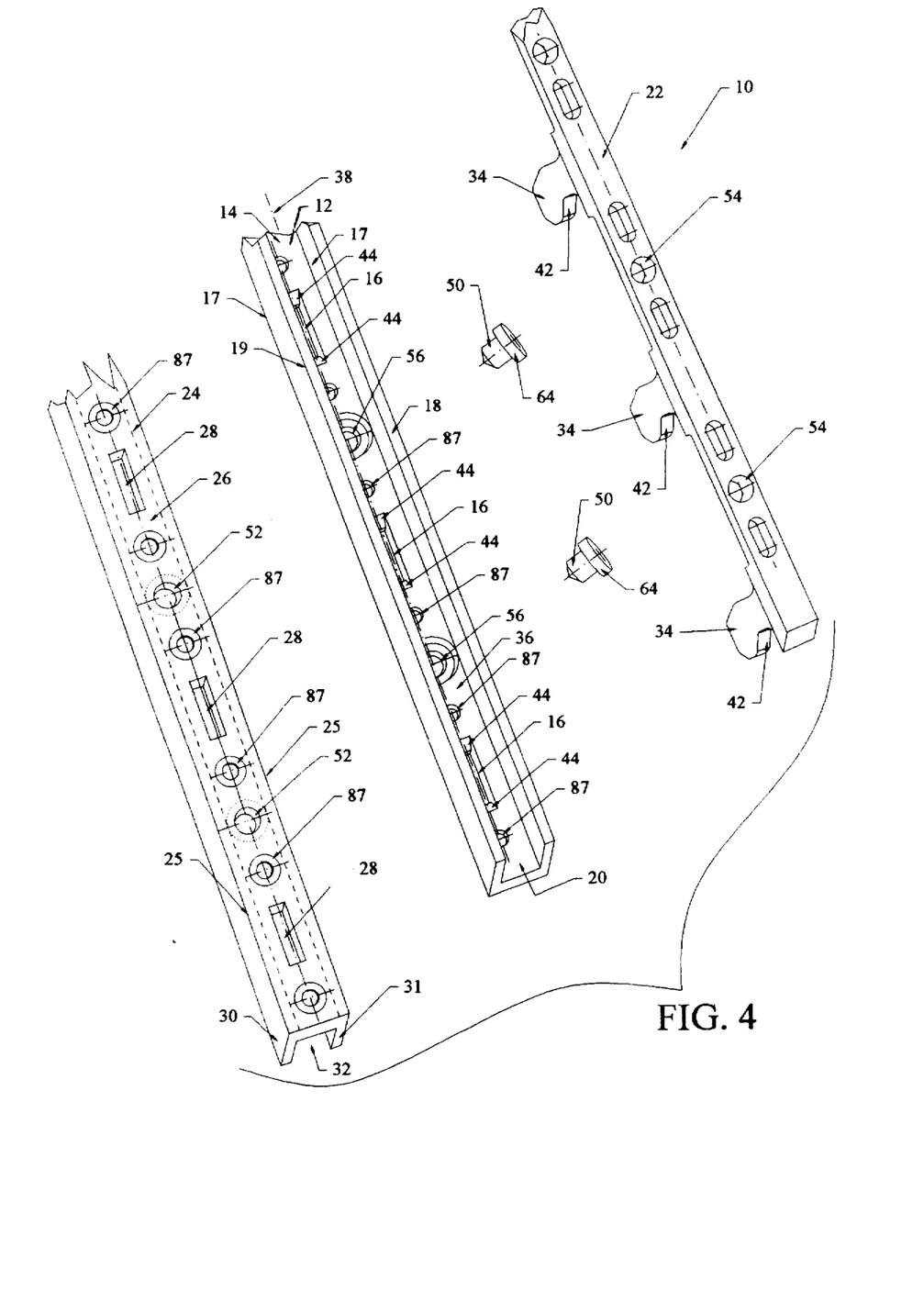
FIG. 4 is an exploded perspective view of the present invention.
Figure 5:
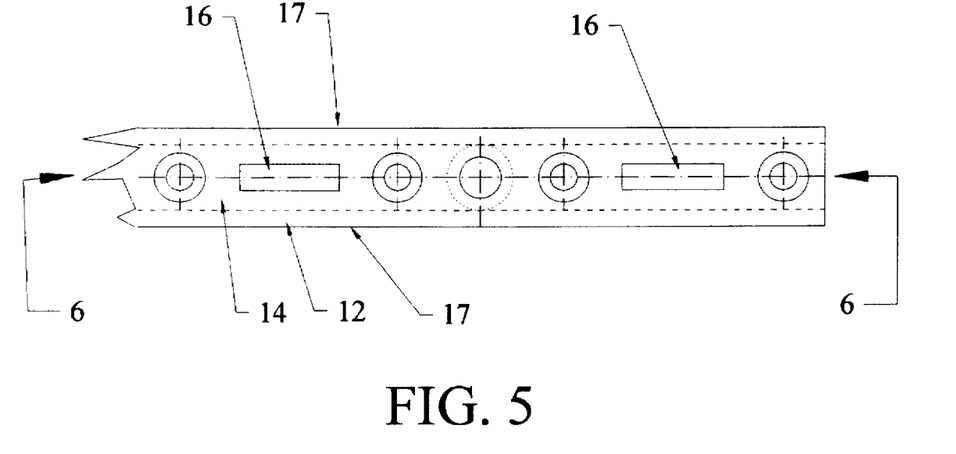
FIG. 5 is a top view of a rail of the present invention.

The pin member 50 is reversible and selectably positionable for engagement with the first rail 12 and inwardly extending from the front wall 14 of the first rail 12 in a second position, as illustrated in FIG. 3. The pin member is extendible in an aperture 54 of the elongated member 22 in the second position to hold first rail 12 and elongated member 22 in fixed position relative to one another with the first rail 12 being movable along the longitudinal axis relative to the second rail 24 for movement between the unlocked position and the locked position in the traditional manner of hook assembly requiring sliding movement of mated members to engage and disengage. Hence, the device 10 allows for two separate manners of engagement.

Figure 6:
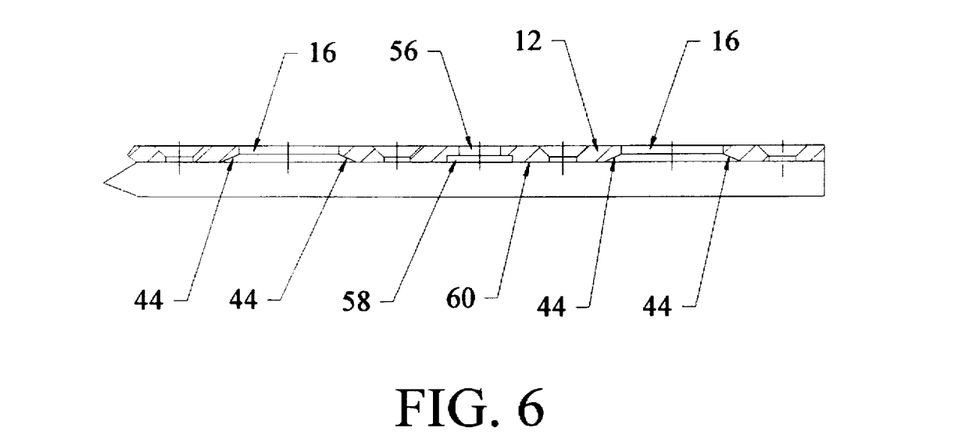
FIG. 6 is a sectional view of the rail taken along line 6—6 of FIG. 5.
Figure 7:
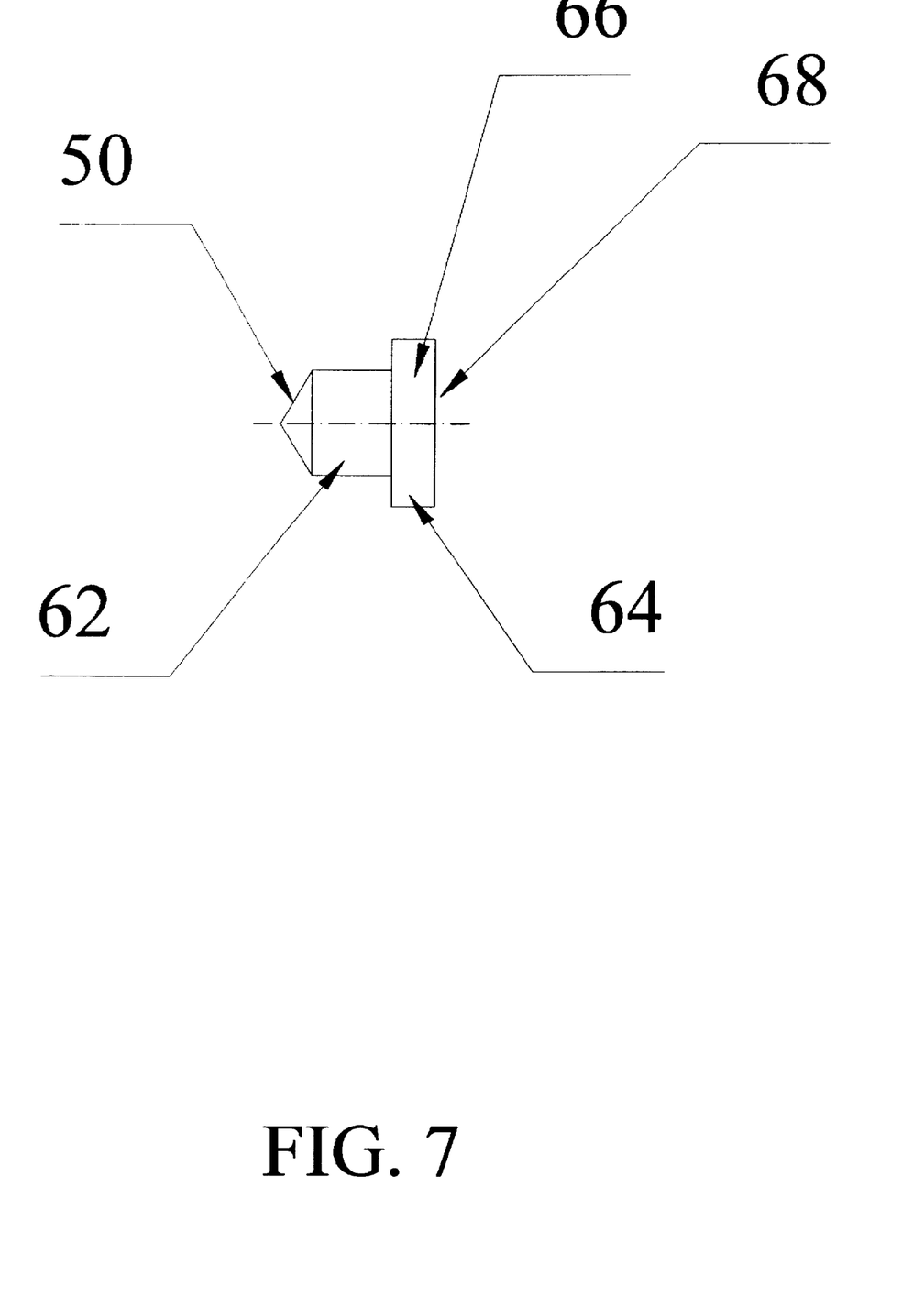
FIG. 7 is a side view of a pin member of the present invention.

In a preferred embodiment, the front wall 14 of the first rail 12 has a pin aperture 56, extending therethrough, as best illustrated in FIG. 6. The aperture 56 of first rail 12 has a counterbore 58 on a back side 60 of the front wall 14. The counterbore 58 has a diameter greater than the diameter of the aperture 56. The pin member 50 has a body member 62 (FIG. 7) extendible through the respective apertures 52, 56 of the first and second rails 12, 24. The pin member 50 has an enlarged head portion 64 at one end 66 (FIG. 7). The enlarged head portion 64 is sized for engagement in the counterbore 58 (FIG. 1). When the pin member is positioned in the first position, an end surface 68 of the counterbore 58 lies approximately coplanar with the back side 60 of the front wall 14 so that it does not obstruct movement of the elongated member 22. The elongated member 22 is disposed immediately adjacent to the end surface 68 to hold the pin member 50 in place.

Referring to FIG. 1, the elongated member 22 has an end portion 70 projecting outwardly from the channel 20 of the first rail 12 in the unlocked position. The end portion 70 is adapted for depression by a user to move the end portion 70 towards the channel 20 causing movement of the elongated member 22 into the locked position to engage the hook 34. Since the first and second rail 12, 24 are both interchangeable, there is considerable flexibility in determining on what side or what connection member the end portion 70 should extend from. A hammer will be typically employed to depress the elongated member 22.

While the length of the elongated member 22 and corresponding rails 12, 24 can be cut to any desired length, which would correspondingly affect the number of hooks 34 on the elongated member 22, it should be understood that the amount of movement of the elongated member 22 needed to engage the device 10 from an unlocked to a locked position and vise versa will remain the same.

In addition to this device 10 providing connection along any desired length, it is also significant to note that the device 10 can be used in the connection of curved members. The components of the device 10 can be manufactured from a number of different materials, such as metal and plastic. It should be understood that the choice of material will affect both the strength of the device 10 and the flexibility of the device to be connected in a curved configuration.

Figure 13:
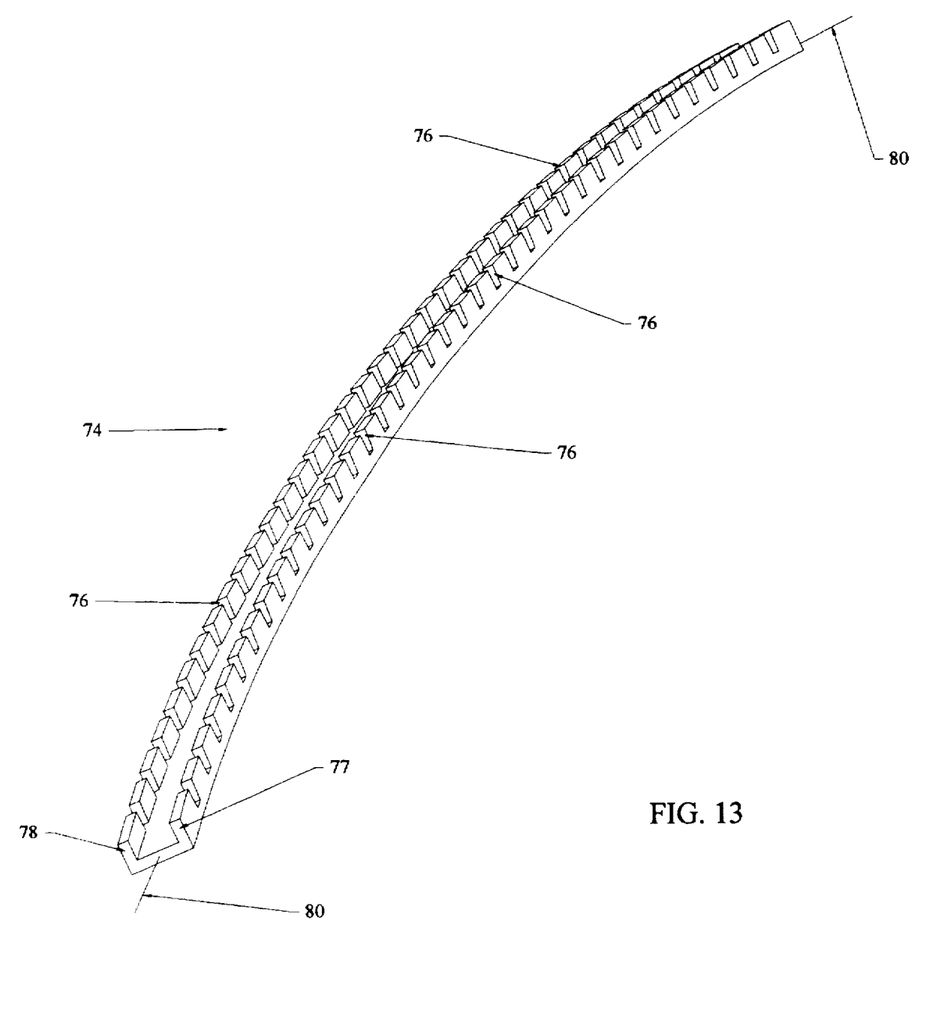
FIG. 13 is a perspective view of an alternative embodiment of the rail having increased flexibility.

To aid in the flexibility of the elongated member 22, portions 72 of the elongated member 22 extending between hooks 24 have a reduced height, as best illustrated in FIG. 9. Referring to FIG. 13, a flexible rail 74 is provided which is constructed in accordance with the previously described first and second rails 12, 24. However, this rail 74 provides enhanced flexibility due to a plurality of spaced apart notches 76 extending in the side walls 77, 78 transverse to a longitudinal axis 80 of the rail 74.

Figure 10:
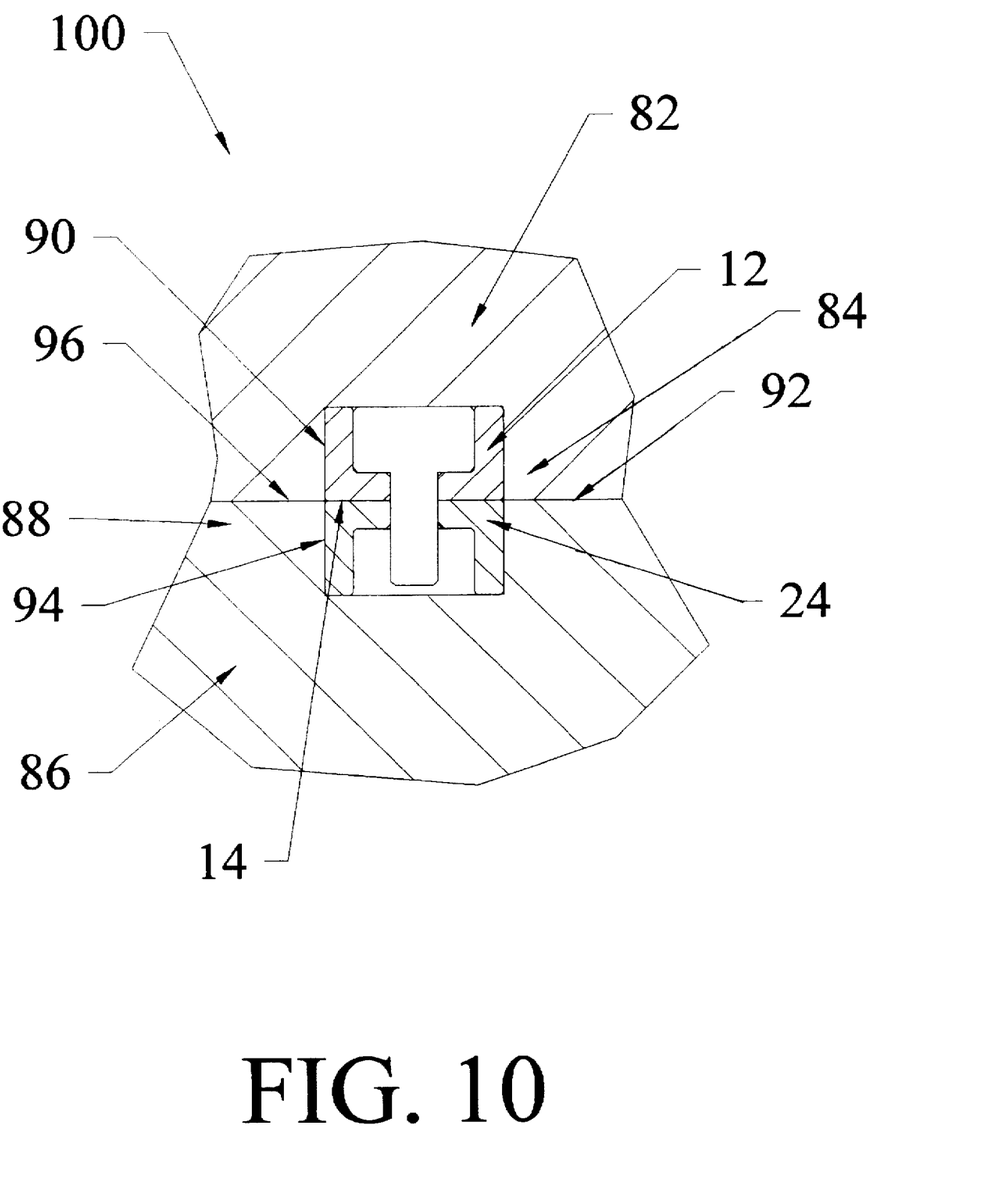
FIG. 10 is a diagrammatic sectional view of two members connected together in a first embodiment.
Figure 11:
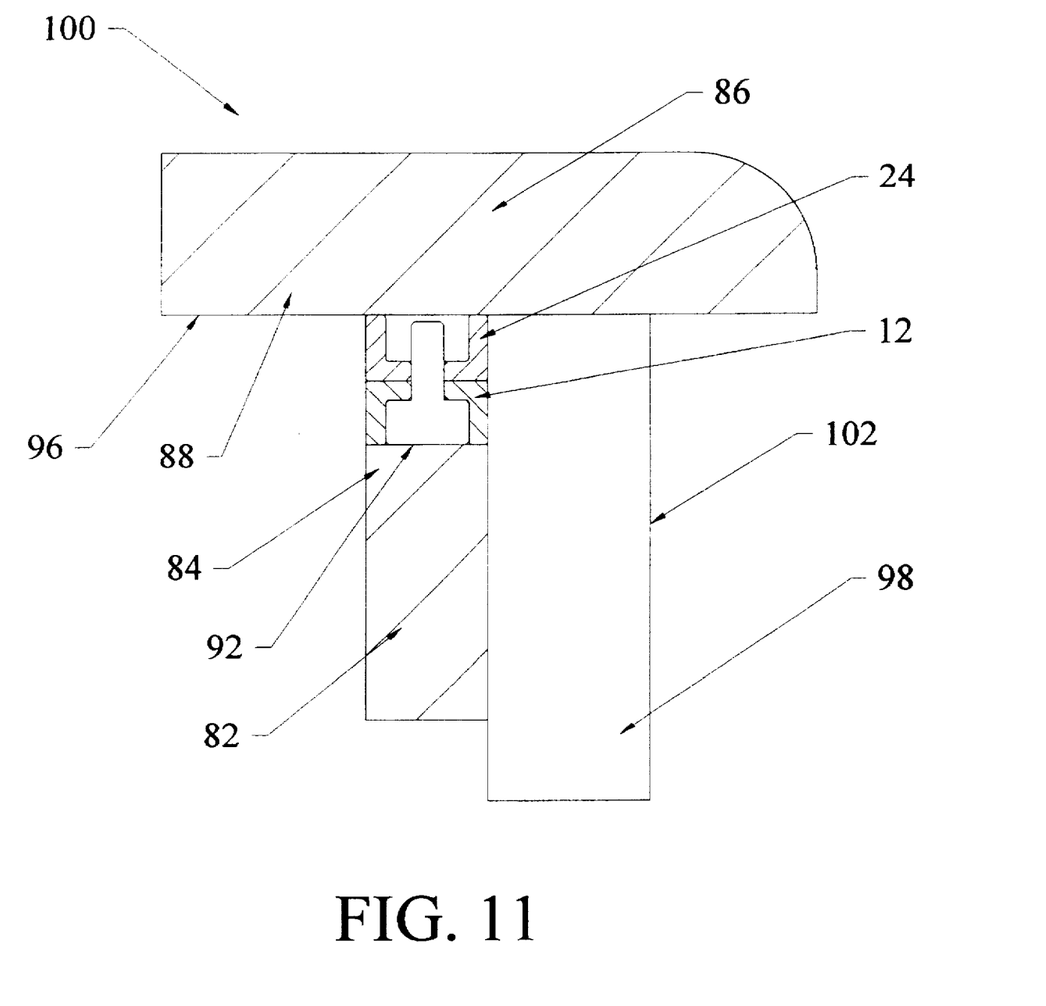
FIG. 11 is a diagrammatic sectional view of two members connected together in a second embodiment.
Figure 12:
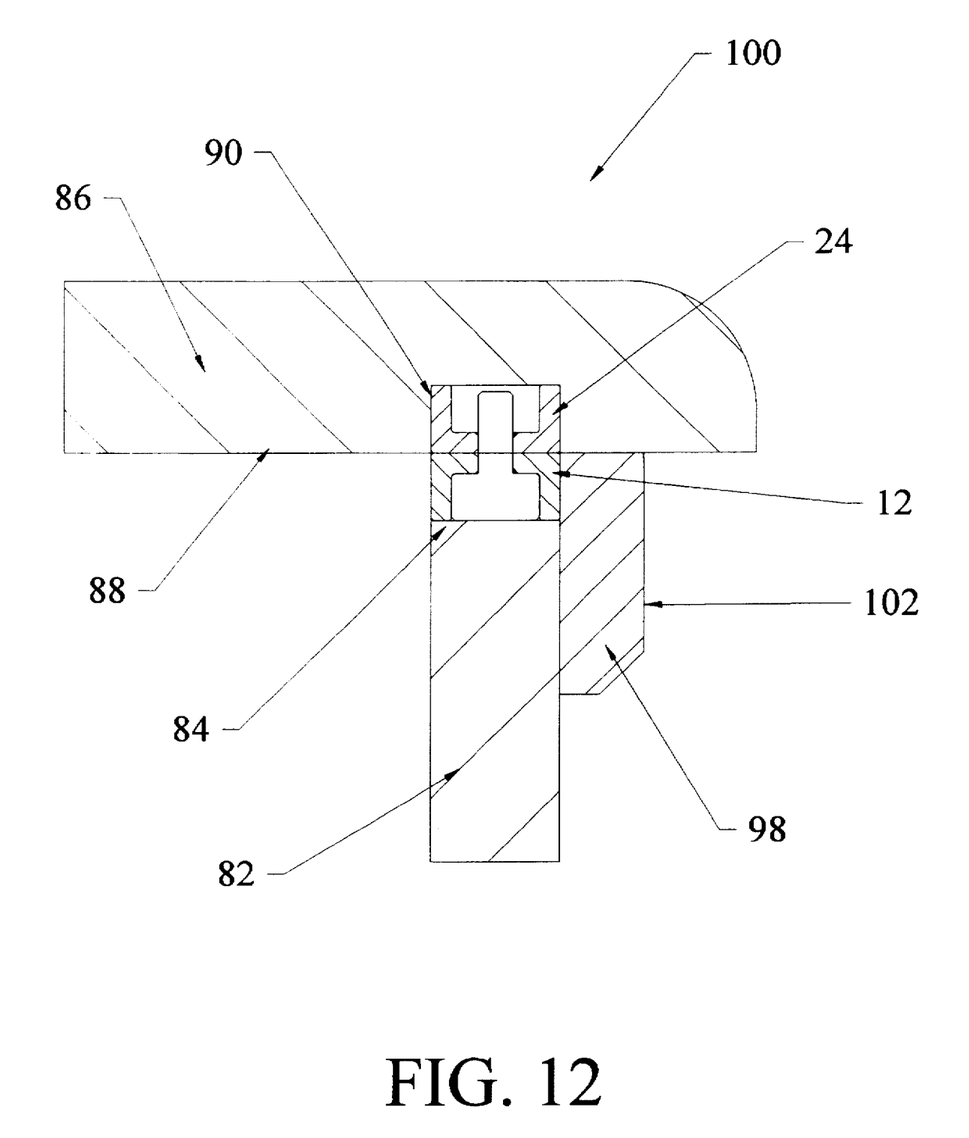
FIG. 12 is a diagrammatic sectional view of two members connected together in a third embodiment.

Referring to FIGS. 10–12, in use, one or more first members or frame members 82 have a connecting end portion 84. One or more second members or frame members 86 have a connecting end portion 88. The connecting end portions 84, 88 have a respective rail 12, 24 connected therewith. The connecting end portions 84, 88 are mated together so that the pin members 50, when in the first position, are aligned and engaged into corresponding apertures 52 of the second rail 24 with the hook 34 entering into the slot 28 (FIG. 2). The elongate member 22 is then depressed to lock the members 82, 86 together (FIG. 1).

In the connection of the first and second rails 12, 24 to the member 82, 86, a number of embodiments are possible depending on the particular application. For example, in FIG. 10 the connecting end portion 84 of the one or more first frame members 82 has a receiving slot 90 size for mounting the first rail 12 therewithin with the front wall 14 of the first rail 12 approximately coplanar with an outer surface 92 of the connection end portion 84. The connecting end portion 88 of the one or more second frame members 86 has a receiving slot 94 size for mounting the second rail 24 therewithin with the front wall 26 of the second rail 24 approximately coplanar with an outer surface 96 of the connection end portion 88. This provides for discrete connection in that the device 10 is not visible when viewing the connection along its length. In mounting of the rails 12, 24 to the members 82, 86, the rails 12, 24 are provided with a plurality of screw holes 87 for receiving screws or nails 89 extending through the holes 87 and in engagement with the corresponding members 82, 86.

Referring to FIG. 11, the first and second members 82, 86 are connected with the first and second rails 12, 24 secured to the outer surfaces 92, 96. A face plate 98 is connected to the first member 82 so that the connector is not visible when viewing the structure 100 from an outer side 102 of the face plate 98. Referring to FIG. 12, a similar configuration to that shown in FIG. 11 is disclosed except the second rail 24 is mounted within a receiving slot 90 of the second member 86.

Additional stiffness of a structural connection of the device 10 can be obtained by allowing the connecting members 82, 86 to fully contact each other, thus utilizing their moment of inertia in the joint, versus that of the device 10. This can be accomplished by mounting the rails slightly lower that the outer surfaces 92, 96 of the connecting members 82, 86, such as in the general configuration shown in FIG. 10. The front walls 14, 26 being secured approximately 0.010" to 0.020" below the outer surfaces 92, 96 would accomplish this. Accordingly, once connected, a slight gap would exist between the rails 12, 24.

In an alternative embodiment, adjacent outer surfaces of the front walls 14, 26 of the first and second rails 12, 24 are provided with a layer of rubber type material for pressing engagement with one another in the locked position. In this configuration, the rails 12, 24 could be mounted slightly above the outer surfaces 92, 96 of the connecting members 82, 86, such as between 0.005' and 0.015", so that when engaged, the rubber type material gets compressed until the members 82, 86 are in contact. This provides additional preload to the joint as well as more protection against vibration loosening.

In the construction of the frame support or modular knock-down structures 100, all of the various connecting members may be prefabricated for use with the device 10 as previously shown. In some circumstances, even within a common structure, it may be difficult to gain access to the end portion 70 of the elongated member 22 or simply a locked connection resistant to disengagement is not desired, in such circumstances placement of the pins in the second position, shown in FIG. 3, allows for the device to operate in the traditional manner previously described where connecting members are slid relative to one another to engage and disengage the device 10.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A locking device for providing a releasable connection, comprising:

(a) a first rail having a front wall provided with a slot;

(b) a second rail having a front wall provided with a slot, the front walls of the first and second rails being positioned in confronting relationship with one another;

(c) an elongated member having at least one hook extending therefrom, the elongated member being disposed on a back side of the front wall of the first rail with the hook extending through the slots of the first and second rails, the elongated member being movable along a longitudinal axis of the first rail from an unlocked position to a locked position with the hook engageable with the second rail, the elongated member having an aperture; and (d) a pin member engaging the first rail and outwardly extending from the front wall of the first rail in a first position, the second rail having an aperture sized for receiving the pin member in engagement therewith in the first position to hold the first and second rail in fixed alignment with one another to prevent relative movement between the first and second rails in a plane generally coplanar with the front walls of the first and second rails, the pin member being reversible for engagement with the first rail and inwardly extending from the front wall of the first rail in a second position, the pin member being extendible in the aperture of the elongated member in the second position to hold the first rail and elongated member in fixed position relative to one another with the first rail being movable along the longitudinal axis relative to the second rail for movement between the unlocked position and the locked position.

2. The device of claim 1, wherein the front wall of the first rail has an aperture extending therethrough, the aperture of the first rail having a counterbore on a back side of the front wall, the pin member having a body member extendible through the apertures of the first and second rails, the pin member having an enlarged head portion at one end thereof, the enlarged head portion sized for engagement in the counterbore.

3. The device of claim 1, wherein the hook has an angularly projecting portion having an inwardly sloped edge, the inwardly sloped edge being engagable with a tapered surface of the second rail extending between a back side of the front wall of the second rail and the slot of the second rail.

4. The device of claim 1, wherein the first rail has a pair of spaced apart side walls connected perpendicular to the front wall of the first rail, the side walls and front wall of the first rail forming a channel sized for receiving the elongated member therewithin, the second rail having a pair of spaced apart side walls connected perpendicular to the front wall of the second rail, the side walls and front wall of the second rail forming a channel.

5. A locking device for providing a releasable connection, comprising:

(a) a first rail having a front wall provided with a slot;

(b) a second rail having a front wall provided with a slot, the front walls of the first and second rails being positioned in confronting relationship with one another;

(c) an elongated member having at least one hook extending therefrom, the elongated member being disposed on a back side of the front wall of the first rail with the hook extending through the slots of the first and second rails, the elongated member being movable along a longitudinal axis of the first rail from an unlocked position to a locked position with the hook engageable with the second rail; and (d) pin means engaging transversely between the first and second rail for holding the first and second rail in fixed alignment with one another to prevent relative movement between the first and second rails in a plane generally coplanar with the front walls of the first and second rails.

6. The device of claim 5, wherein the pin means is selectably positionable in a second position for engaging the first rail and elongated member to hold the first rail and elongated member in fixed position relative to one another, the first rail being slidably movable along the longitudinal axis relative to the second rail for movement between the unlocked position and the locked position.

7. The device of claim 5, wherein the pin means includes a pin member engaging the first rail and outwardly extending from the front wall of the first rail, the second rail having an aperture sized for receiving the pin member in engagement therewith.

8. The device of claim 7, wherein the front wall of the first rail has an aperture extending therethrough, the aperture of the first rail having a counterbore on a back side of the front wall, the pin member having a body member extendible through the apertures of the first and second rails, the pin member having an enlarged head portion at one end thereof, the enlarged head portion sized for engagement in the counterbore.

9. The device of claim 5, wherein the hook has an angularly projecting portion having an inwardly sloped edge, the inwardly sloped edge being engagable with a tapered surface of the second rail extending between a back side of the front wall of the second rail and the slot of the second rail.

10. The device of claim 9, wherein the inwardly sloped edge and tapered surface are in angled relationship approximately 10 to 15 degrees from a longitudinal axis of the second rail.

11. The device of claim 5, wherein the first rail has a pair of spaced apart side walls connected perpendicular to the front wall of the first rail, the side walls and front wall of the first rail forming a channel sized for receiving the elongated member therewithin, the second rail having a pair of spaced apart side walls connected perpendicular to the front wall of the second rail, the side walls and front wall of the second rail forming a channel.

12. The device of claim 11, wherein the elongated member has an end portion projecting outwardly from the channel of the first rail in the unlocked position, the end portion being adapted for depression by a user to move the end portion towards the channel of the first rail causing movement of the elongated member into the locked position.

13. The device of claim 11, wherein the side walls of the first and second rails have a plurality of spaced apart notches extending in the side walls transverse to a longitudinal axis of each corresponding rail to provide flexibility in the first and second rails for mounting in a curved position.

14. The device of claim 5, further comprising means for mounting the first rail to a first member and means for mounting the second rail to a second member.

15. A frame support system comprising:

(a) one or more first frame members having a connecting end portion;

(b) one or more second frame members having a connecting end portion;

(c) a locking device for providing a releasable rigid connection between the connecting end portion of the one or more first frame members and one or more second frame members, the locking device including:

(1) a first rail having a front wall provided with a slot, the first rail being fixedly secured to the connecting end portion of the one or more first frame members;

(2) a second rail having a front wall provided with a slot, the second rail being fixedly secured to the connecting end portion of the one or more second frame members, the front walls of the first and second rails being positioned in confronting relationship with one another;

(3) an elongated member having at least one hook extending therefrom, the elongated member being disposed on a back side of the front wall of the first rail with the hook extending through the slots of the first and second rails, the elongated member being movable along a longitudinal axis of the first rail from an unlocked position to a locked position with the hook engageable with the second rail, the elongated member having an aperture; and (4) a pin member engaging the first ril and outwardly extending from the front wall of the first rail in a first position, the second rail having an aperture sized for receiving the pin member in engagement therewith in the first position to hold the first and second rail in fixed alignment with one another to prevent relative movement between the first and second rails in a plane generally coplanar with the front walls of the first and second rails, the pin member being reversible for engagement with the first rail and inwardly extending from the front wall of the first rail in a second position, the pin member being extendible in the aperture of the elongated member in the second position to hold the first rail and elongated member in fixed position relative to one another with the first rail being movable along the longitudinal axis relative to the second rail for movement between the unlocked position and the locked position.

16. The frame support system of claim 15, wherein the front wall of the first rail has an aperture extending therethrough, the aperture of first rail having a counterbore on a back side of the front wall, the pin member having a body member extendible through the apertures of the first and second rails, the pin member having an enlarged head portion at one end thereof, the enlarged head portion sized for engagement in the counterbore.

17. The frame support system of claim 15, wherein the hook has an angularly projecting portion having an inwardly sloped edge, the inwardly sloped edge being engagable with a tapered surface of the second rail extending between a back side of the front wall of the second rail and the slot of the second rail.

18. The frame support system of claim 15, wherein the first rail has a pair of spaced apart side walls connected perpendicular to the front wall of the first rail, the side walls and front wall of the first rail forming a channel sized for receiving the elongated member therewithin, the second rail having a pair of spaced apart side walls connected perpendicular to the front wall of the second rail, the side walls and front wall of the second rail forming a channel.

19. The frame support system of claim 18, wherein the elongated member has an end portion projecting outwardly from the channel of the first rail in the unlocked position, the end portion being adapted for depression by a user to move the end portion towards the channel of the first rail causing movement of the elongated member into the locked position.

20. The frame support system of claim 18, wherein the connecting end portion of the one or more first frame members has a receiving slot sized for mounting the first rail therewithin with the front wall of the first rail approximately coplanar with an outer surface of the connecting end portion of the one or more first frame members.

21. The frame support system of claim 18, wherein the connecting end portion of the one or more second frame members has a receiving slot sized for mounting the second rail therewithin with the front wall of the second rail approximately coplanar with an outer surface of the connecting end portion of the one or more second frame members.

22. A modular knock-down structure including one or more first members and one or more second members, the one or more first members and one or more second members each having connecting end portions detachably secured to one another by locking devices, the locking devices comprising:

(a) a first rail having a front wall provided with a slot, the first rail being fixedly secured to the connecting end portion of the one or more first members;

(b) a second rail having a front wall provided with a slot, the second rail being fixedly secured to the connecting end portion of the one or more second members, the front walls of the first and second rails being positioned in confronting relationship with one another;

(c) an elongated member having at least one hook extending therefrom, the elongated member being disposed on a back side of the front wall of the first rail with the hook extending through the slots of the first and second rails, the elongated member being movable along a longitudinal axis of the first rail from an unlocked position to a locked position with the hook engageable with the second rail, the elongated member having an aperture; and (d) a pin member engaging the first rail and outwardly extending from the front wall of the first rail in a first position, the second rail having an aperture sized for receiving the pin member in engagement therewith in the first position to hold the first and second rail in fixed alignment with one another to prevent relative movement between the first and second rails in a plane generally coplanar with the front walls of the first and second rails, the pin member being reversible for engagement with the first rail and inwardly extending from the front wall of the first rail in a second position, the pin member being extendible in the aperture of the elongated member in the second position to hold the first rail and elongated member in fixed position relative to one another with the first rail being movable along the longitudinal axis relative to the second rail for movement between the unlocked position and the locked position.

23. The modular knock-down structure of claim 22, wherein the front wall of the first rail has an aperture extending therethrough, the aperture of first rail having a counterbore on a back side of the front wall, the pin member having a body member extendible through the apertures of the first and second rails, the pin member having an enlarged head portion at one end thereof, the enlarged head portion sized for engagement in the counterbore.

24. The modular knock-down structure of claim 23, wherein the first rail has a pair of spaced apart side walls connected perpendicular to the front wall of the first rail, the side walls and front wall of the first rail forming a channel sized for receiving the elongated member therewithin, the second rail having a pair of spaced apart side walls connected perpendicular to the front wall of the second rail, the side walls and front wall of the second rail forming a channel.

25. The modular knock-down structure of claim 24, wherein the elongated member has an end portion projecting outwardly from the channel of the first rail in the unlocked position, the end portion being adapted for depression by a user to move the end portion towards the channel of the first rail causing movement of the elongated member into the locked position to rigidly secure the one or more first members and one or more second members together.

26. A locking device for providing a releasable connection, comprising:

(a) a first rail having an aperture and a front wall provided with a slot;

(b) a second rail having an aperture and a front wall provided with a slot, the front walls of the first and second rails being positioned in confronting relationship with one another;

(c) an elongated member having an aperture and at least one hook extending therefrom, the elongated member being disposed on a back side of the front wall of the first rail with the hook extending through the slots of the first and second rails, in a first arrangement, a pin member engaging transversely between the first and second rails in said apertures of said first and second rails for holding the first and second rail in fixed alignment with one another, to prevent relative movement between the first and second rails in a plane generally coplanar with the front walls of the first and second rails, the elongated member being movable along a longitudinal axis of the first rail from an unlocked position to a locked position with the hook engageable with the second rail; and in a second arrangement, said pin member reversibly engaging the first rail and elongated member in said apertures of said first rail and said elongated member to hold the first rail and elongated member in fixed position relative to one another, said first rail and elongated member being movable together along a longitudinal axis of the second rail from an unlocked position to a locked position with the hook engageable with the second rail.

* * * * *